United States Patent

[11] 3,550,616

| [72] | Inventors | Marvin M. Graham<br>San Pedro;<br>Lauren D. Haskins, Long Beach, Calif. |
|---|---|---|
| [21] | Appl. No. | 734,926 |
| [22] | Filed | June 6, 1968 |
| [45] | Patented | Dec. 29, 1970 |
| [73] | Assignee | Robertshaw Controls Company<br>Richmond, Va.<br>a corporation of Delaware |

[54] CHECK VALVE WITH RESTRICTED BYPASS FLOW
1 Claim, 12 Drawing Figs.

[52] U.S. Cl........................................................ 137/513.7,
137/513.3, 137/533.19
[51] Int. Cl......................................................... F16k 15/02
[50] Field of Search............................................ 137/513.7,
513.5, 513.3; 138/42; 251/117; 137/599, 533, 17,
9

[56] References Cited
UNITED STATES PATENTS

| 1,187,537 | 6/1916 | Loomis......................... | 137/513.5 |
| 1,505,695 | 8/1924 | Boyd............................ | 137/533.19 |
| 2,021,079 | 11/1935 | Mittendorf.................... | 138/42 |
| 3,375,855 | 4/1968 | Deeks............................ | 138/42 |
| 3,439,660 | 4/1969 | Lesher.......................... | 138/42 |

FOREIGN PATENTS

| 469,291 | 11/1950 | Canada......................... | 137/513.5 |

Primary Examiner—William F. O'Dea
Assistant Examiner—William H. Wright
Attorneys—Auzville Jackson, Jr., Robert L. Marben and Christen, Sabol and O'Brien ABSTRACT: A fluid flow check valve including a casing having a flow aperture on each end, a floating valve member preventing a free fluid flow in one direction through one end and permitting a free fluid flow through the other end; a restricted fluid flow bypasses the valve member to permit a restricted flow when the valve member is in its flow preventing position.

PATENTED DEC 29 1970

INVENTORS,
MARVIN M. GRAHAM
LAUREN D. HASKINS

BY Christen, Sabol & O'Brien
ATTORNEYS

INVENTORS
MARVIN M. GRAHAM
LAUREN D. HASKINS

Christen, Sabol & O'Brien

ATTORNEYS

CHECK VALVE WITH RESTRICTED BYPASS FLOW

BACKGROUND OF THE INVENTION

This invention relates to flow control valves, and in particular, to a check valve which permits an unrestricted flow in one direction and a restricted flow in the opposite direction.

Conventional prior art devices have utilized check valves with restricted passages for flow paths; however, such devices have been ineffective because the cross-sectional flow area of the restricted orifice had to be limited to design dimensions which enhanced the possibility of clogging.

SUMMARY OF THE INVENTION

It is, therefore, an object of the present invention to provide a check valve with a restricted flow path that is elongated to accomplish the function of flow restriction.

Another object of the present invention is to assemble a free floating valve member in a casing that does not require any particular orientation for its operation.

The present invention is summarized in the assembly of a check valve including a hollow casing having a peripheral wall, transverse members on each end of the casing attached to the peripheral wall, flow aperture means in each transverse member, valve means in the casing movable between the transverse members to define flow permitting and flow preventing positions, bypass means establishing a fluid flow bypassing the valve means when in its flow preventing position, and a flow restricting passage forming a part of the bypass means to restrict the bypass fluid flow.

DESCRIPTION OF THE PREFERRED EMBODIMENTS

Figure 1:
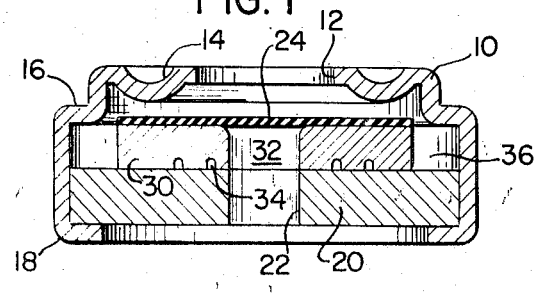
FIG. 1 is a cross section of a check valve embodying the present invention.
Figure 2:
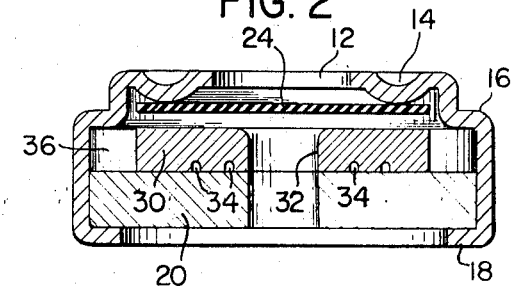
FIG. 2 is a cross section similar to FIG. 1 but showing its valve member in a second controlling position.
Figure 3:
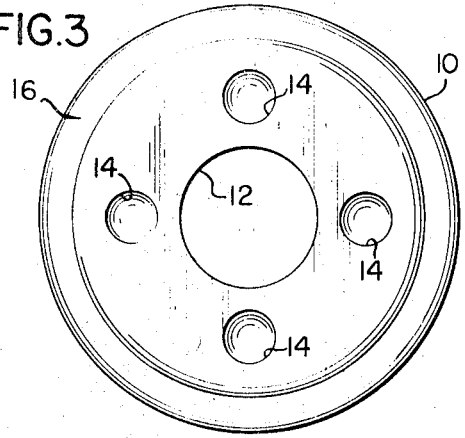
FIG. 3 is a top plan view of FIG. 1.
Figure 4:
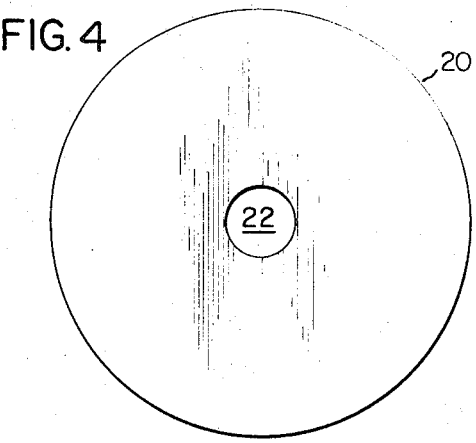
FIG. 4 is a top plan view of a detail of FIG. 1.

As is shown in FIGS. 1 and 2, an embodiment of the present invention includes an inverted cup-shaped container or casing 10 having a flow aperture 12 in a transverse member defining its flat wall; a plurality of inwardly directed dimples or bosses 14 in such wall are circumferentially spaced around the aperture 12. The peripheral or cylindrical wall of the casing 10 is deformed adjacent the flat end wall to define an annular shoulder 16 while the lip of the cylinder wall has an inwardly bent peripheral flange 18. A flat plate member 20 having a central bore or flow aperture 22 is seated in the casing 10 and rests on the flange 18. A thin, relatively light free floating disc 24 acts as a valve and is disposed in the casing 10 underneath the dimples 14 for a purpose to be described more fully hereinafter.

Figure 5:
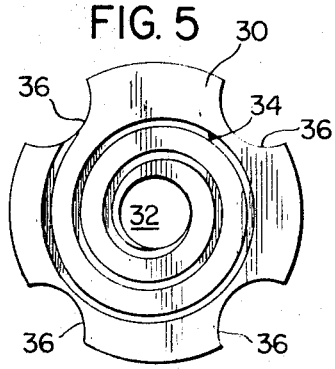
FIG. 5 is a bottom plan view of a detail of FIG. 1.

A flat plate member in the form of a disc 30 having a central bore 32 rests on the plate 20 with the bores 22 and 32 being aligned. The plates or discs 20 and 30 are fixed in the casing 10 by being peripherally clamped between the annular shoulder 16 and the peripheral flange 18 whereby such plates as a unit define a lower transverse member for the casing 10. As is illustrated in FIG. 5, the disc 30 is provided with a surface recess in the form of a spiral groove 34 extending between the aperture 32 and one or more peripheral recesses 36 cut out of the circumferential wall of the disc 30. The diameter of the flexible valve disc 24 is the same as the inner diameter of the disc 30, which inner diameter is equal to the outer diameter of the disc 30 minus the dimension of the recess 36. Each recess 36 has an arcuate shape and is of greater depth than the width of the annular shoulder 16; with such an arrangement, communication is continuously established between the bore 22 and the casing aperture 12. The grooved surface of disc 30 is in surface contact with the disc 20 which thus forms one wall of the spiral groove 34.

In operation of the above check valve, relatively free flow is obtained in the upward direction as shown in FIG. 2 wherein the pressure of the fluid flow displaces the thin valve member 24 from the disc 30 and into contact with the dimples 14 underneath the upper transverse member of the casing 10. The fluid flow thus proceeds unrestricted through a path traced from the bores 22 and 32 through the chamber defined by the valve member 24 and the corresponding surface of the disc 30, thence around the periphery of the valve member 24 and across the top surface thereof between the dimples 14 to the flow aperture 12.

FIG. 1 represents the flow path in the downward direction wherein the pressure of the fluid flow causes the thin valve member 24 to lie flat on the top of disc 30 and prevent a fluid flow into the top of disc bore 32. The fluid flow thus proceeds in a restricted path traced from the aperture 12 into the chamber defined by the top of the thin valve member 24, around the periphery of the valve member 24, through the recess 36 and the spiral groove 34 to the aligned bores 32 and 22. The relatively long path of the grooved restrictor 34 enables a higher degree of restriction than could be obtained with a simple orifice of the same cross-sectional flow area. The restricting feature is further enhanced by the change of directions which the fluid flow must undergo; e.g., the downward vertical direction of the fluid flow changes perpendicularly to the edge of the valve member 24, thence to a downward vertical direction through the recess 36 whence it again changes perpendicularly to the plane of the groove 34, after which it again changes to a downward vertical direction through the bores 32 and 22.

It should be noted that the thin valve member 24 is a free floating valve which is moved by pressure between the dimples 14 and the top surface of the disc 30. Accordingly, even though FIGS. 1 and 2 have been described in terms of upward and downward directions, the entire assembly constitutes a capsule which may be oriented in any direction, i.e., the capsule may be inverted or it may be mounted on its side because the thin valve member 24 is not gravity responsive.

Figure 6:
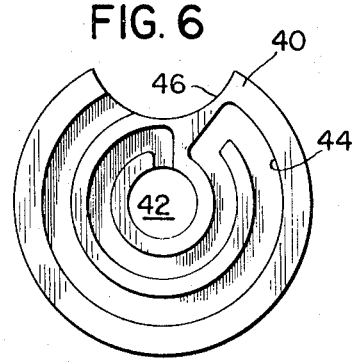
FIG. 6 is a bottom plan view similar to FIG. 5 but showing a modification thereof.

The amount of flow restriction increases with the length of the restricting groove. In addition, a groove configuration with a rapid or substantial change in radius may also be used to increase the restriction for an equivalent cross-sectional flow area. In the modification of FIG. 6, the end plate or transverse member in the form of a disc 40 has a central bore 42 (alignable with disc bore 22 of FIG. 1), and a restricting groove 44 establishing communication between a peripheral recess 46 and the bore 42. The groove 44 consists of concentrically spaced recesses whereby the flow direction from the peripheral recess 46 undergoes a 180° reversal and than a 90° change leading to the central bore 42. The disc 40 may replace the disc 30 of FIGS. 1 and 2 and since its operation in the capsule 10 is similar to that of FIGS. 1 and 2, a description of its sequence of operation is being omitted for the sake of brevity.

Figure 7:
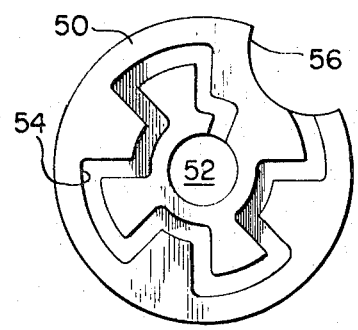
FIG. 7 is a bottom plan view similar to FIG. 5 but showing a second modification.

Similarly, the operation of the modification of FIG. 7 is being omitted, wherein the second plate member in the form of a disc 50 has a central bore 52 (alignable with disc bore 22 of FIG. 1), and a restricting groove 54 establishing communication between a peripheral recess 56 and a bore 52. The groove 54 consists of a generally annular zigzag configuration whereby the flow direction has a plurality of abrupt changes.

Thus, the disc 50 in FIG. 7 has a grooved restrictor 54 that provides a higher degree of restriction for equal length and cross section than the grooved restrictor 44 in disc 40; similarly, the grooved restrictor 44 provides a higher degree of restriction for equal length and cross section than the grooved restrictor 34 in the disc 30.

FIGS. 8—12 illustrate a modification of the check valve casing and in order to facilitate its correlation with FIGS. 1—5, the same reference numerals with 100 added are utilized for similar structural parts. For example, the embodiment shown in FIGS. 8—12 includes a cup-shaped container or casing 110 having a transverse member 111 with a centrally disposed flow aperture 112. A plurality of inwardly directed dimples or bosses 114 in the transverse plate 111 are circumferentially spaced around the aperture 112; a similar number of similarly spaced dimples or bosses 115 are outwardly directed from the surface of the transverse plate 111 whereby the plate may be assembled with either surface directed toward the interior of the casing 110. The peripheral or cylindrical wall of the casing 110 has an inner surface provided with an annular shoulder 116 on which the transverse plate 111 is seated; a plurality of inwardly directed, hemispherical lugs 118 are equally spaced about the inner periphery of the cylindrical wall to define fastening means for the transverse plate 111. Since the casing 110 is made of a plastic material the transverse plate 111 is easily inserted by merely pressing downwardly past the lugs 118. A second flat plate member 120 is disposed in the bottom of the casing 110 and has a central hollow annulus defining a flow aperture 122, the lowermost portion of which is flared outwardly at 123 to secure the plate 122 in a fixed position.

Figure 8:
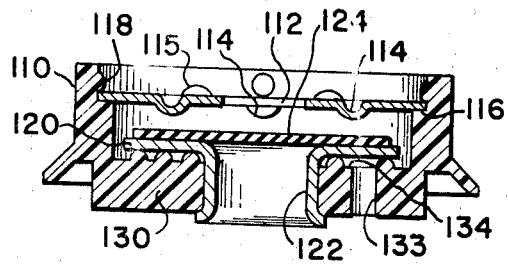
FIG. 8 is a cross section of a check valve similar to FIG. 1 but showing a modification thereof.
Figure 9:
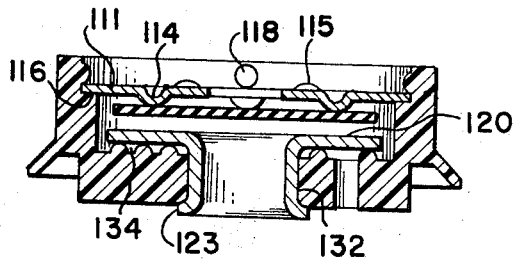
FIG. 9 is a cross section similar to FIG. 8 but showing its valve member in a second controlling position.
Figure 10:
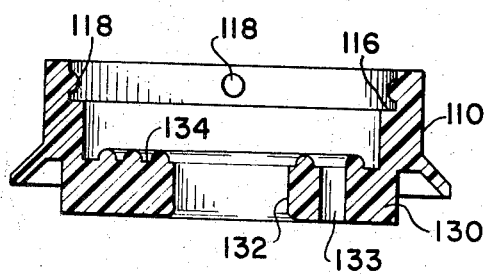
FIG. 10 is a cross section of the valve body of FIG. 8.
Figure 12:
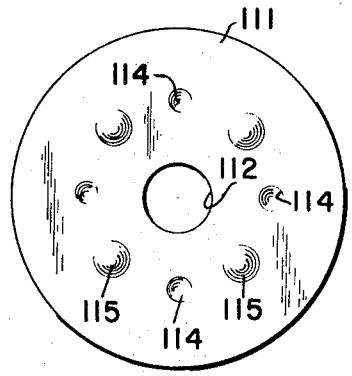
FIG. 12 is a top plan view of a detail of FIG. 8.
Figure 11:
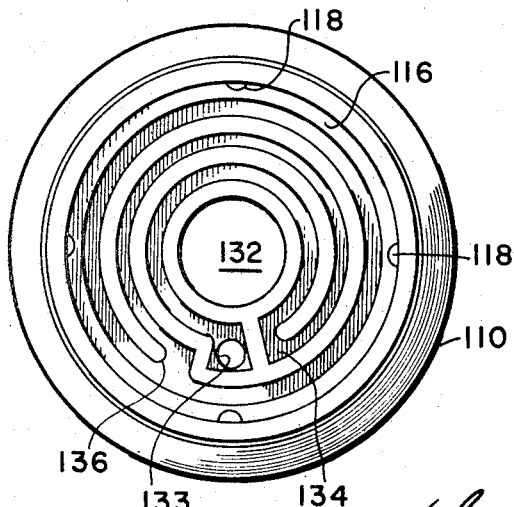
FIG. 11 is a top plan view of FIG. 10 rotated 90°.

A thin, relatively light free floating disc 124 acts as a valve and is disposed in the casing for movement between a flow preventing position when it is seated on the top of plate 120 (FIG. 8) and a flow permitting position when it engages the bosses 114 (FIG. 9).

In the embodiments of FIGS. 8—12, the lowermost transverse member 130 is integrally formed with the cylindrical wall of the casing 110 to define a cup-shaped configuration. The central portion of the transverse member 130 has an opening 132 which receives the cylindrical portion 122 of the plate 120. Radially spaced from the opening 132, the transverse member 130 has an opening 133, the innermost portion of which communicates with one end of a flow restriction groove 134 integrally formed in the top surface of the transverse member 130. The other end of groove 134 has a peripheral opening 136 (FIG. 11) which communicates with the chamber that houses the valve member 124. The diameter of the valve disc 124 and the diameter of the plate 120 are each smaller than the diameter of the valve chamber; accordingly, communication is continuously established between the flow aperture 112 and the opening 133 to define a restricted flow which bypasses the valve disc 124.

The operation of the embodiment illustrated in FIGS. 8—12 is substantially the same as that described above in FIGS. 1 and 2, except that the restricted bypass flow has a separate outlet 133. A specific description of a sequence of operation of FIGS. 8 and 9 is thus deemed unnecessary and is being omitted for the sake of brevity. It should be noted however that the specific groove recess 134 shown in FIG. 11 may be replaced with any of the specific modifications of the restricting groove, such as 34 in FIG. 5, 44 in FIG. 6 and 54 in FIG. 7.

Inasmuch as the present invention is subject to many modifications, variations and changes in detail, it is intended that all matter contained in the foregoing description or shown on the accompanying drawing shall be interpreted as illustrative and not in a limiting sense.

We claim:

1. A check valve capsule comprising;

a casing having a cylindrical wall and a transverse wall integrally joined to define a generally cup-shaped configuration;

a transverse plate disposed in said casing in spaced relation to said transverse wall to define a valve chamber therebetween;

an annular shoulder on an inner surface of said cylindrical wall seating said plate;

fastening means on said inner surface engaging said plate to retain the same on said annular shoulder;

flow aperture means in said plate and in said transverse wall;

valve means disposed in said valve chamber for movement relative to said transverse wall to define flow permitting and flow preventing positions with respect to flow between the valve chamber and said flow aperture means in said transverse wall;

bypass means in said transverse wall to establish a bypass flow out of the valve chamber and through said transverse wall when said valve means is in its flow preventing position;

flow restricting means in said bypass means to restrict the bypass flow;

said flow restricting means including an elongated passage disposed in a plane transverse to the plane defined by said flow aperture means in said transverse wall;

said valve means including a lightweight, free floating valve disc movable solely in response to pressure of the fluid flow between its flow permitting and flow preventing positions; and a plurality of bosses on said plate projecting into said valve chamber for engagement by said valve disc to preclude closure of said flow aperture means in said plate.